(12) United States Patent
Kim et al.

(10) Patent No.: US 8,897,232 B2
(45) Date of Patent: Nov. 25, 2014

(54) APPARATUS AND METHOD FOR SUPPORTING FREQUENCY OVERLAY IN BROADBAND WIRELESS COMMUNICATION SYSTEM

(75) Inventors: Nam-Gi Kim, Suwon-si (KR); Jae-Hee Cho, Seoul (KR); Hyoung-Kyu Lim, Seoul (KR); Min-Hee Cho, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1359 days.

(21) Appl. No.: 12/053,034

(22) Filed: Mar. 21, 2008

(65) Prior Publication Data
US 2008/0232337 A1 Sep. 25, 2008

(30) Foreign Application Priority Data
Mar. 21, 2007 (KR) .................. 10-2007-0027496

(51) Int. Cl.
*H04W 4/00* (2009.01)
*H04J 3/16* (2006.01)
*H04J 3/22* (2006.01)
*H04W 72/04* (2009.01)
*H04L 5/02* (2006.01)

(52) U.S. Cl.
CPC ............. *H04L 5/023* (2013.01); *H04W 72/048* (2013.01)
USPC ............ 370/329; 370/328; 370/338; 370/468

(58) Field of Classification Search
CPC ............................. H04W 72/048; H04L 5/023
USPC .................... 370/328, 329, 338, 468
See application file for complete search history.

(56) References Cited

U.S. PATENT DOCUMENTS

| | | | | |
|---|---|---|---|---|
| 6,529,488 | B1 * | 3/2003 | Urs et al. | 370/330 |
| 7,953,411 | B1 * | 5/2011 | Chion | 455/436 |
| 2007/0002898 | A1 * | 1/2007 | Boariu et al. | 370/468 |
| 2007/0274253 | A1 * | 11/2007 | Zhang et al. | 370/328 |
| 2008/0039090 | A1 * | 2/2008 | Jin et al. | 455/436 |

FOREIGN PATENT DOCUMENTS

| | | |
|---|---|---|
| KR | 102007000148 | 1/2007 |
| KR | 102007003000 | 3/2007 |

* cited by examiner

*Primary Examiner* — Shripal Khajuria
*Assistant Examiner* — Farhad Ali
(74) *Attorney, Agent, or Firm* — The Farrell Law Firm, P.C.

(57) ABSTRACT

A broadband wireless communication system is provided. A sending apparatus in the broadband wireless communication system includes a controller for distributing packets to a plurality of processors to transmit the packets in a multi-Frequency Allocation (FA) access mode; the plurality of the processors for processing the packet provided from the controller in a Media Access Control (MAC) layer; and a plurality of senders for encoding the packets provided from the corresponding processors in a physical layer and transmitting a signal generated through the physical layer encoding.

24 Claims, 10 Drawing Sheets

(A)

(B)

(C)

APPARATUS AND METHOD FOR SUPPORTING FREQUENCY OVERLAY IN BROADBAND WIRELESS COMMUNICATION SYSTEM

PRIORITY

This application claims priority under 35 U.S.C. §119(a) to a Korean patent application filed in the Korean Intellectual Property Office on Mar. 21, 2007 and assigned Serial No. 2007-27496, the entire disclosure of which is incorporated herein by reference.

BACKGROUND OF THE INVENTION

1. Field of the Invention

The present invention relates generally to a broadband wireless communication system, and in particular, to an apparatus and a method for communicating using a multi-Frequency Allocation (FA) access scheme in a broadband wireless communication system.

2. Description of the Related Art

A great number of wireless communication techniques has been suggested for a high-speed mobile communication. Among them, an Orthogonal Frequency Division Multiplexing (OFDM) scheme is considered as the most dominant next-generation wireless communication technique. It is anticipated that the OFDM will be applied to most of the wireless communication techniques in 2010. A Wireless Metropolitan Area Network (WMAN) of the Institute of Electrical and Electronics Engineers 802.16 called the $3.5^{th}$-Generation technology also adopts OFDM as the standard specification.

Meanwhile, wireless communication systems have advanced to serve high-speed data or address various issues in the implementation. In the process of the development, various systems can coexist in the same region according to their compatibility with the existing systems. For example, a new advanced system can be installed in the region of an IEEE 802.16e system. In this case, the new system should be able to support the service to both of the existing terminal and the new terminal.

Through a single Frequency Allocation (FA), the current OFDM broadband wireless communication system supports only a terminal which uses a single bandwidth. Hence, to support a new terminal to be developed to use a wider bandwidth, the FA of the system needs to be changed to a new FA of the corresponding bandwidth. However, the system of the changed FA cannot serve the terminal, which uses the existing narrow bandwidth. In other words, when the FA of the system is changed, it is necessary to change the existing terminals at the same time. In this respect, in the development of the broadband wireless communication system, a method for supporting both the existing terminal using the narrow bandwidth and the new terminal using the wide bandwidth is needed.

SUMMARY OF THE INVENTION

An aspect of the present invention is to solve at least the above mentioned problems and/or disadvantages and to provide at least the advantages described below. Accordingly, an aspect of the present invention is to provide an apparatus and a method for concurrently supporting terminals, which use different bandwidths in a broadband wireless communication system.

Another aspect of the present invention is to provide an apparatus and a method for a pair of a sender and a receiver to communicate using a multiple Frequency Allocations (FAs) at the same time in a broadband wireless communication system.

The above aspects are achieved by providing a sending apparatus in a broadband wireless communication system. The sending apparatus includes a controller for distributing packets to a plurality of processors to transmit the packets in a multi-Frequency Allocation (FA) access mode; the plurality of the processors for processing the packet provided from the controller in a Media Access Control (MAC) layer; and a plurality of senders for encoding the packets provided from the corresponding processors in a physical layer and transmitting a signal generated through the physical layer encoding.

In accordance with an aspect of the present invention, a receiving apparatus in a broadband wireless communication system includes a plurality of receivers for performing a physical layer decoding on a signal received through a corresponding FA among a plurality of signals concurrently received through multiple FAs from a sending end in multi-FA access communications; a plurality of processors for performing a MAC layer processing on packets recovered through the physical layer decoding of the corresponding receiver of the plurality of the receivers; and a controller for aggregating and processing packets processed by the processors.

In accordance with another aspect of the present invention, a communication method of a sending end in a broadband wireless communication system includes distributing packets on a FA basis to transmit the packets in a multi-FA access mode; performing a MAC layer processing on the packets for each FA; and performing a physical layer encoding on the packets which are completely MAC layer processed, on the FA basis and transmitting signals generated through the physical layer encoding.

In accordance with yet another aspect of the present invention, a communication method of a receiving end in a broadband wireless communication system includes performing a physical layer decoding on a plurality of signals concurrently received through multiple FAs from a sending end in multi-FA access communications; performing a MAC layer processing on packets recovered through the physical layer decoding; and aggregating and processing packets processed by the processors.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications to the embodiments described herein can be made without departing from the scope and spirit of the invention. Also, descriptions of well-known functions and constructions are omitted for clarity and conciseness.

The present invention provides a technique for supporting terminals, which use different bandwidths at the same time in a broadband wireless communication system. An Orthogonal Frequency Division Multiplexing (OFDM) wireless communication system is illustrated by way of example, but the present invention is applicable to any other wireless communication systems.

Figure 1A:
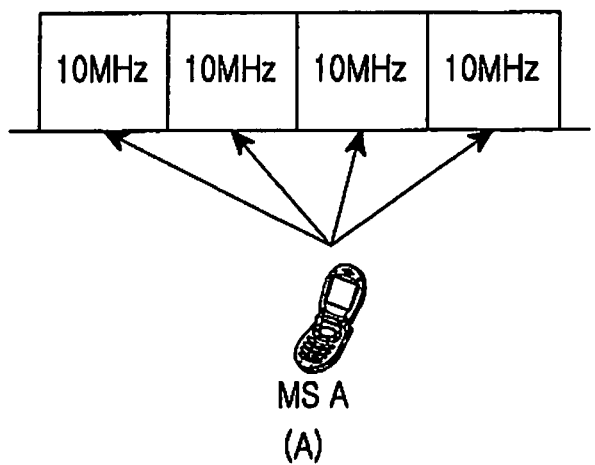
FIG. 1A illustrates a bandwidth change in a broadband wireless communication system.
Figure 1A:
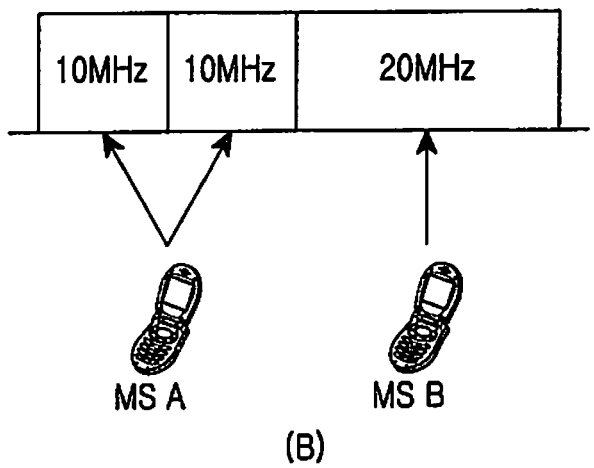
Figure 1A:
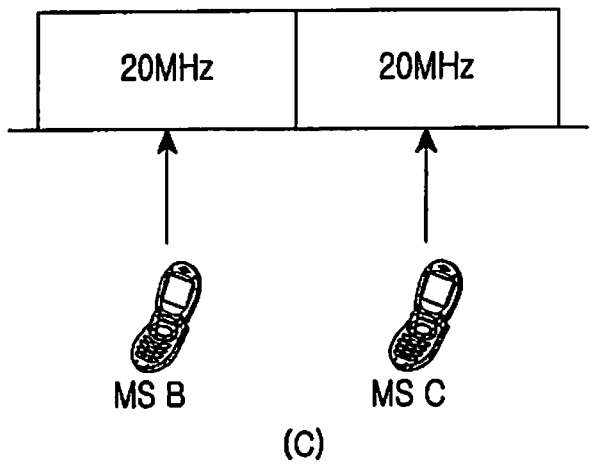
Figure 1B:
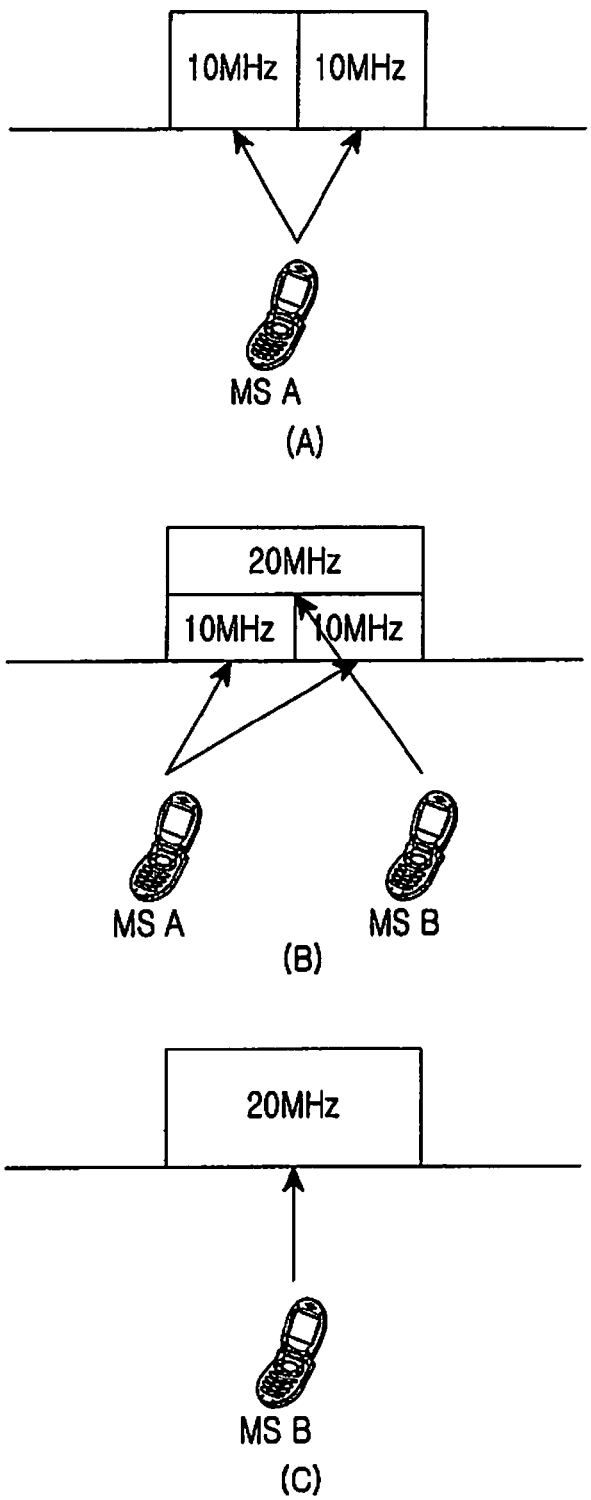
FIG. 1B illustrates a bandwidth change in a broadband wireless communication system.

FIGS. 1A and 1B illustrate two expected bandwidth change processes. In FIGS. 1A and 1B, a Mobile Station (MS) A is an existing terminal using a narrow bandwidth and MS B and MS C are new terminals using wide bandwidths.

In the first case, (a) of FIG. 1A depicts the bandwidth usage of legacy system. Since the MS A supports 10 MHz, the system divides the total 40 MHz bandwidth by 10 MHz. Accordingly, the MS A can communicate using one of four 10 MHz bandwidths. (b) of FIG. 1A depicts the bandwidth usage of a transitional system. To serve both of the MS A supporting 10 MHz and the MS B supporting the 20 MHz at the same time, the system divides the total 40 MHz bandwidth to two 10 MHz bandwidths and one 20 MHz bandwidth. Hence, the MS A can communicate using one of the two 10 MHz bandwidths and the MS B can communicate using the 20 MHz bandwidth. (c) of FIG. 1A depicts the bandwidth usage of a future system. Since the MSs will support only 20 MHz in the future, the future system divides the total 40 MHz bandwidth by 20 MHz. Hence, the MSs B and C can communicate using one of the two 20 MHz bandwidths.

In the second case, (a) of FIG. 1B depicts the bandwidth usage of the legacy system. Since the MS A supports 10 MHz, the system divides the total 20 MHz bandwidth by 10 MHz. Hence, the MS A can communicate using one of the two 10 MHz bandwidths. (b) of FIG. 1B depicts the bandwidth usage of the transitional system. To serve both of the MS A supporting 10 MHz and the MS B supporting 20 MHz, the system divides the total 20 MHz bandwidth by 10 MHz. The system frequency-overlays two 10 MHz Frequency Allocations (FAs) with 20 MHz bandwidth. Accordingly, the MS A can use one of the two FAs for communications, and the MS B can use both of the two FAs for communications. (c) of FIG. 1B depicts the bandwidth usage of the future system. Since the MSs will support only 20 MHz in the future, the future system utilizes the total 20 MHz bandwidth for the MS C. That is, the MS C uses the 20 MHz bandwidth for communications.

In FIGS. 1A and 1B, the MS B of the transitional system and the MS C of the future system are separately provided because they can comply with different standards while supporting the same bandwidth.

The present invention pertains to the transitional system in (b) of FIG. 1B. When the system supports both of the legacy MS and the transitional MS using the frequency overlay as shown in FIG. 1B, the legacy MS and the new MS can be supported using the narrower bandwidth at the same time. Thus, it is more effective than the system of FIG. 1A in terms of the frequency utilization.

Figure 2:
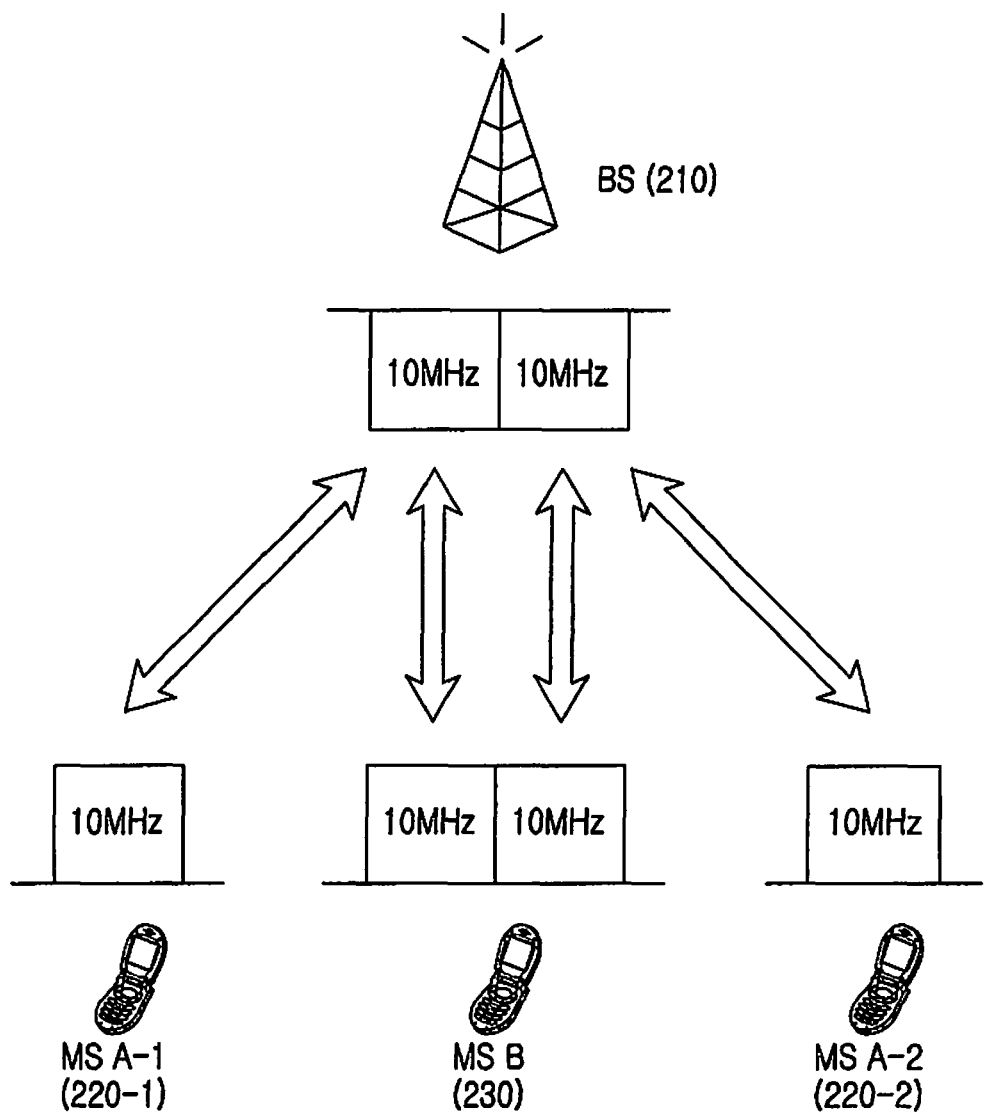
FIG. 2 illustrates a frequency band usage in a broadband wireless communication system according to the present invention.

FIG. 2 illustrates a frequency band usage in a broadband wireless communication system according to the present invention. It is assumed that there are two FAs in FIG. 2 for the understanding. Note that the system can use three or more FAs.

A Base Station (BS) 210 uses two FAs of 10 MHz bandwidth. Legacy MS A-1 220-1 and MS A-2 220-2 communicate using only one FA of 10 MHz bandwidth. A new MS B 230 uses two FAs of 10 MHz bandwidth at the same time for communications. Herein, the connection between the BS 210 and the MS B 230 is established per FA in FIG. 2. The MS B 230 holds two connections through two FAs of 10 MHz bandwidth and uses 20 MHz bandwidth in total for communications. As such, using the frequency overlay, the BS 210 can support both of the new MS and the legacy MS. Since the two FAs are independent of each other, similar to the legacy MS, the MS B 230 can use only one FA for communications if necessary.

To independently operate two FAs, the BS and the MS need to have an independent Media Access Control (MAC) address for each FA, and to manage and operate a network entry, a context (e.g., CID, AK ID, and SA ID), and a handover signaling on the FA basis using the separate MAC addresses. With the independent MAC addresses on the FA basis, the change of the legacy standard is minimized. Even with the independent MAC addresses on the FA basis, an upper layer should recognize as a single MS. For doing so, it is required to map the plurality of the MAC addresses of one MS to a single Internet Protocol (IP) address.

Figure 3:
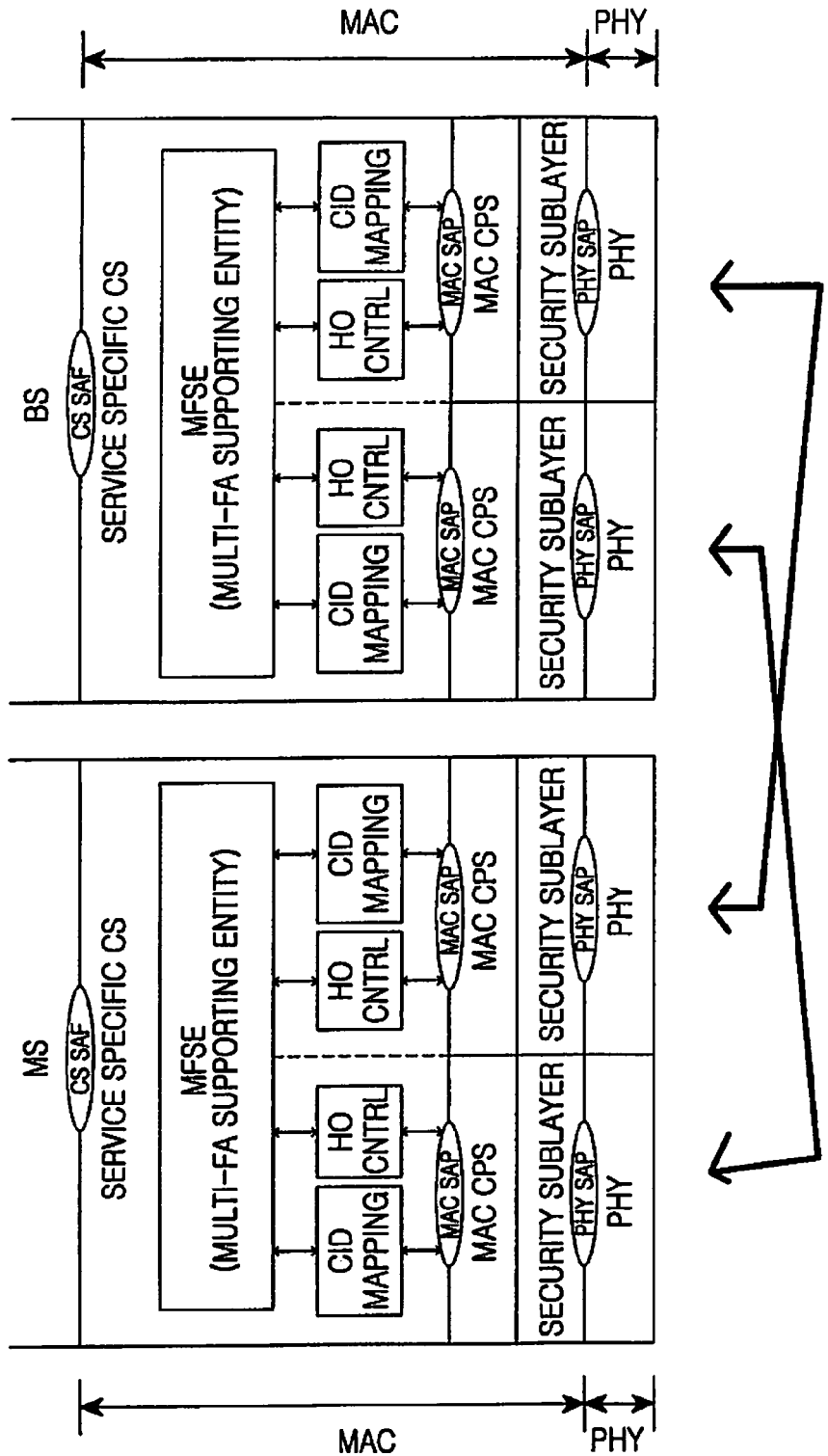
FIG. 3 illustrates a protocol stack in the broadband wireless communication system according to the present invention.

FIG. 3 illustrates a protocol stack in the broadband wireless communication system according to the present invention.

The protocol stack for supporting the multi-FA in FIG. 3 largely includes a PHYsical (PHY) layer and a Media Access Control (MAC) layer. The MAC layer includes a Security Sublayer (SS), a MAC Common Part Sublayer (CPS), and a Convergence Sublayer (CS). To support two FAs, two PHY layers and two MAC layers are provided. To coordinate the two FAs, the CS includes a Multi_FA Supporting Entity (MFSE). Herein, the position of the MFSE is a mere example. The MFSE can be placed in other upper layer (e.g., IP layer) of the MAC layer, and in a separate layer or in a separate sublayer.

The CS converts a service protocol such as digital audio/video multicast protocol, digital telephony protocol, and Internet access protocol, in conformity to the MAC protocol. The CS converts an IP packet to a MAC Service Data Unit (SDU) having the corresponding Connection ID (CID) and provides the MAC SDU to the MAC CPS. Conversely, the CS converts a MAC SDU received from the MAC CPS to an IP packet and provides the IP packet to the upper layer.

The MAC CPS controls the access to the shared radio medium, and controls the flow of data and control signal according to a prescribed MAC protocol. Also, the MAC CPS generates a MAC Protocol Data Unit (PDU) and a burst with MAC SDUs received from the CS and provides the MAC PDU and the burst to the lower layer, and extracts MAC SDUs from data received from the lower layer and provides the extracted MAC SDUs to the CS.

The SS performs security related functions such as authentication, encryption, and key management. The PHY layer converts the burst generated at the MAC CPS to a transmittable signal. The PHY layer converts a signal received in a radio link to data and provides the data to the upper layer.

The MFSE controls a multi-FA capability negotiation to check if the multi-FA is supported between the MS and the BS. The MFSE distributes packets received from the upper layer to the FAs and aggregates packets from the lower layer to one IP. When the MFSE is present in the MAC CPS, the packets can be distributed using an IP fragmentation function. In the handover, the MFSE controls to hand the multiple FAs connected to the same MS over to the same target BS.

Figure 4:
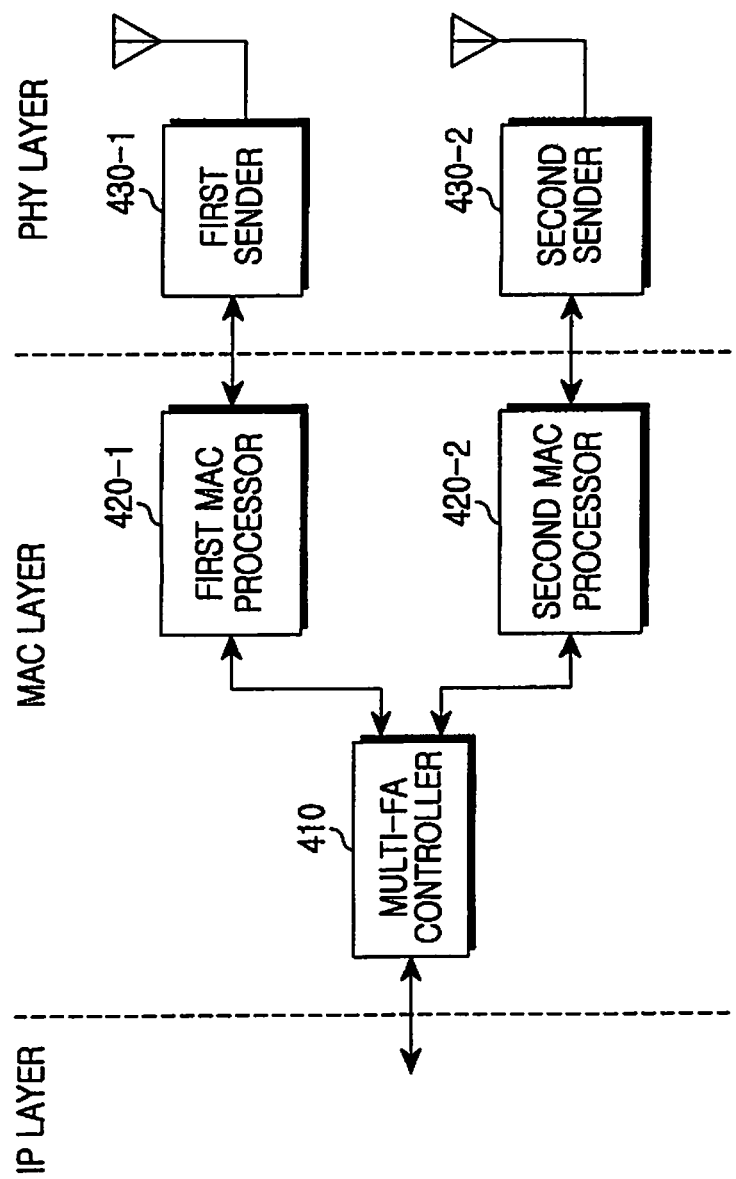
FIG. 4 illustrates a sending end in the broadband wireless communication system according to the present invention.

FIG. 4 is a block diagram of the sending end in the broadband wireless communication system according to the present invention. In FIG. 4, it is assumed that the sending end uses two FAs.

The sending end of FIG. 4 includes a multi-FA controller 410, a first MAC processor 420-1, a second MAC processor 420-2, a first sender 430-1, and a second sender 430-2.

The multi-FA controller 410 distributes transmit packets provided from the upper layer to the first MAC processor 420-1 and the second MAC processor 420-2 for the communications through the multiple FAs. More specifically, the multi-FA controller 410 fragmentizes the MAC SDU provided from the upper layer and distributes the fragments to the first MAC processor 420-1 and the second MAC processor 420-2 according to a predefined rule. The multi-FA controller 410 controls the first MAC processor 420-1 and the second MAC processor 420-2 not to use the same band. Also, in the initial connection to the receiving end, the multi-FA controller 410 checks if the communications using the multiple FAs are feasible by controlling the multi-FA capability negotiation.

When the sending end is a mobile terminal, the multi-FA controller 410 selects the FA to use for the communications and determines the number of the FAs to be used. When the sending end is the mobile terminal and the handover is conducted during the communications using the multiple FAs, the multi-FA controller 410 controls the first MAC processor 420-1 and the second MAC processor 420-2 to hand over to different FAs of the same target BS with respect to the currently used FAs.

The first MAC processor 420-1 performs the function of the MAC layer to transmit the packet using one of the multiple FAs. The first MAC processor 420-1 generates the MAC PDU by inserting a MAC header and an error check (e.g., Cyclic Redundancy Check (CRC)) code to the packet distributed by the multi-FA controller 410, and generates control information for using the radio resource for the corresponding FA. The first MAC processor 420-1 constitutes a frame by arranging the packet and the control information. In doing so, the CID mapped to the MAC PDU is different from the CID mapped by the second MAC processor 420-2. Also, the first MAC processor 420-1 performs a control signaling (e.g., handover signaling and access signaling) on the corresponding FA. The second MAC processor 420-2 performs the same function as the first MAC processor 420-1 with respect to one of the multiple FAs. Note that the second MAC processor 420-2 has the MAC address different from the first MAC processor 420-1. In other words, the first MAC processor 420-1 and the second MAC processor 420-2 perform the function of the MAC layer using the independent MAC addresses.

The first sender 430-1 encodes the bit stream provided from the first MAC processor 420-1 in the PHY layer and transmits the signal generated through the PHY layer encoding over an antenna. For example, the first sender 430-1 channel-codes and modulates the fed bit stream, and generates OFDM symbols through an Inverse Fast Fourier Transform (IFFT) operation. The first sender 430-1 up-converts the OFDM symbols to the frequency band corresponding to the FA managed by the first MAC processor 420-1 and transmits the converted symbols over the antenna.

The second sender 430-2 receives the bit stream from the second MAC processor 420-2 and performs the same function as the first sender 430-1. Note that the second sender 430-2 up-converts the signal to the different frequency band from the first sender 430-1 and then transmits the converted signal. The second sender 430-2 up-converts the bit stream to the frequency band corresponding to the FA managed by the second MAC processor 420-2 and then transmits the converted signal.

Figure 5:
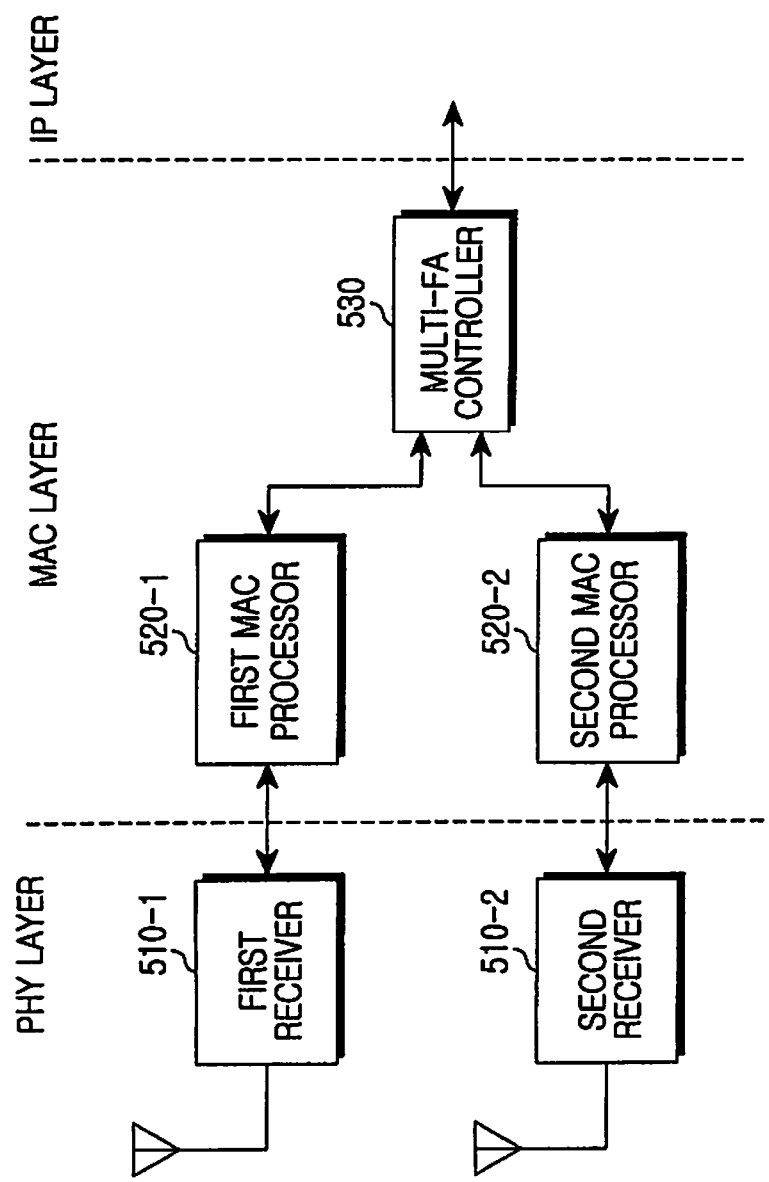
FIG. 5 illustrates a receiving end in the broadband wireless communication system according to the present invention.

FIG. 5 is a block diagram of the receiving end in the broadband wireless communication system according to the present invention. In FIG. 5, it is assumed that the receiving end uses two FAs.

The BS of FIG. 5 includes a first receiver 510-1, a second receiver 510-2, a first MAC processor 520-1, a second MAC processor 520-2, and a multi-FA controller 530.

The first receiver 510-1 converts the received signal to an information bit stream by decoding the received signal in the PHY layer. In other words, the first receiver 510-1 recovers the control information and the packet from the received signal. For instance, the first receiver 510-1 acquires the frequency-domain signal of the corresponding FA by filtering the signal received on an antenna. The first receiver 510-1 converts the acquired signal to sample data, OFDM-demodulates the sample data through a FFT operation, recovers the information bit stream by demodulating and decoding the signal, and provides the information bit stream to the first MAC processor 520-1. The second receiver 510-2 acquires the frequency-domain signal corresponding to the FA managed by the second MAC processor 520-2 from the received signal and converts the received signal to the information bit stream in the same process as in the first receiver 510-1. The second receiver 510-2 provides the converted bit stream to the second MAC processor 520-2.

The first MAC processor 520-1 and the second MAC processor 520-2 perform the MAC layer processing on the packet received through one of the multiple FAs. Specifically, the first MAC processor 520-1 conducts several examinations such as error code check and packet header check. The first MAC processor 520-1 performs the control signaling (e.g., handover signaling and initial access signaling) on the corresponding FA. The second MAC processor 520-2 carries out the same function as the first MAC processor 520-1 with respect to one of the multiple FAs. Note that the second MAC processor 520-2 has the different MAC address from the first MAC processor 520-1. That is, the first MAC processor 520-1 and the second MAC processor 520-2 perform the MAC layer function using the independent MAC addresses.

The multi-FA controller 530 maps the receive packets provided from the first MAC processor 420-1 and the second MAC processor 420-2 to one IP address and provides the packets to the upper layer. The multi-FA controller 530 controls the first MAC processor 520-1 and the second MAC processor 520-2 not to use the same band. In the initial connection to the sending end, the multi-FA controller 530 checks if the communications using the multiple FAs are feasible by conducting the multi-FA capability negotiation. When the receiving end is a terminal, in the handover, the multi-FA controller 530 controls the first MAC processor 520-1 and the second MAC processor 520-2 to hand the FAs over to different FAs of the same target BS.

Figure 6:
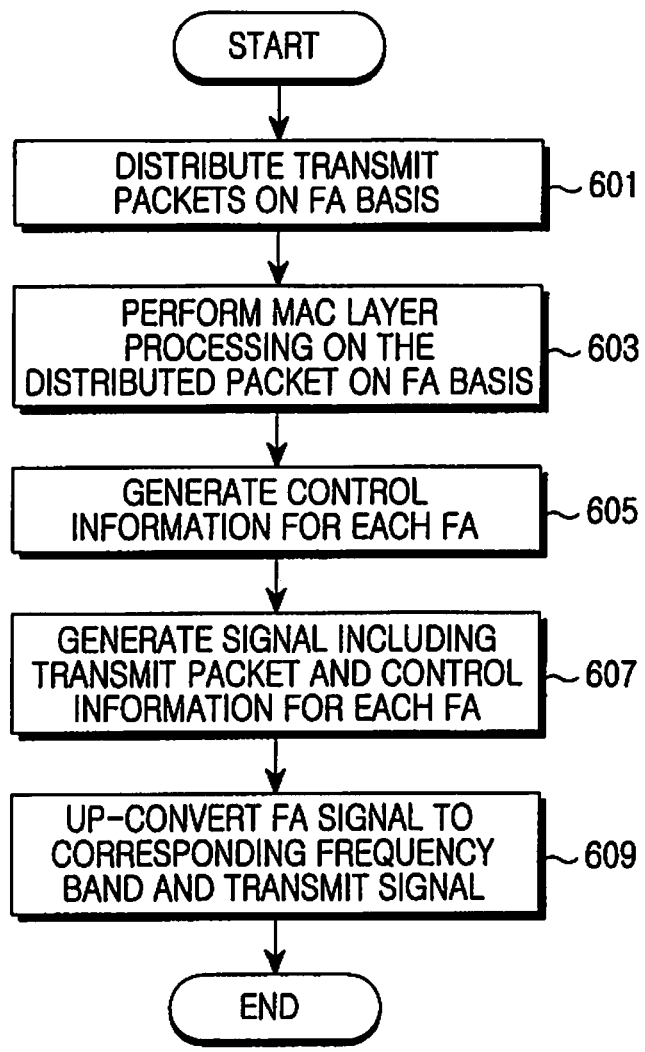
FIG. 6 illustrates a communication process of the sending end in the broadband wireless communication system according to the present invention.

FIG. 6 illustrates a communication process of the sending end in the broadband wireless communication system according to the present invention.

In step 601, the sending end distributes the transmit packets on an FA basis. The sending end distributes the transmit packets generated in the IP layer according to the prescribed rule to transmit the packets through the multiple FAs.

In step 603, the sending end performs the MAC layer processing on the FA basis to send the distributed packets. For example, the sending end inserts the MAC header and the error check code for each FA. In doing so, the MAC layer processing utilizes the independent MAC address and the independent CID for each FA.

In step 605, the sending end generates the control information for using the radio resource for each FA. For example, the sending end generates the message according to the signaling (e.g., handover signaling and initial access signaling) to control the communications.

In step 607, the sending end generates the transmit signal including the transmit packet and the control information for each FA. More specifically, the sending end converts the bit stream to the complex symbol through the channel coding and the modulation, and generates the OFDM symbols through the IFFT operation.

In step 609, the sending end up-converts the signal generated for each FA to the frequency band corresponding to the relevant FA, and then transmits the signal.

Figure 7:
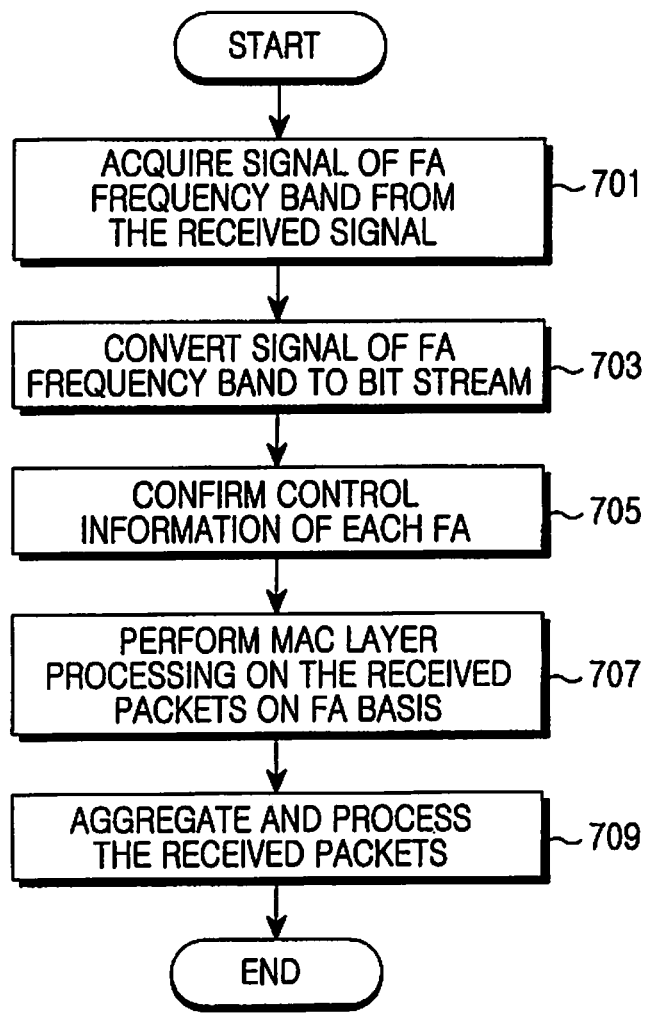
FIG. 7 illustrates a communication process of the receiving end in the broadband wireless communication system according to the present invention.

FIG. 7 illustrates a communication process of the receiving end in the broadband wireless communication system according to the present invention.

In step 701, the receiving end acquires the signal of the frequency band corresponding to each FA from the received signal. The receiving end splits the received signal on an FA basis by filtering the received signal with the corresponding frequency band on the FA basis.

In step 703, the receiving end converts the FA signal to the information bit stream by decoding the FA signal in the PHY layer. That is, the receiving end recovers the control information and the packet. Specifically, the receiving end acquires the bit stream of each FA by Fast Fourier Transform (FFT)-processing, demodulating, and decoding the signal by the OFDM symbol.

In step 705, the receiving end confirms the control information for using the radio resource for each FA. For example, the receiving end confirms the message according to the communication control signaling (e.g., handover signaling and initial access signaling).

In step 707, the receiving end performs the MAC layer processing on the received packet on the FA basis. For example, the receiving end performs the MAC layer processing such as encryption key description.

In step 709, the receiving end aggregates and processes the received packets processed on the FA basis as a single packet.

Figure 8:
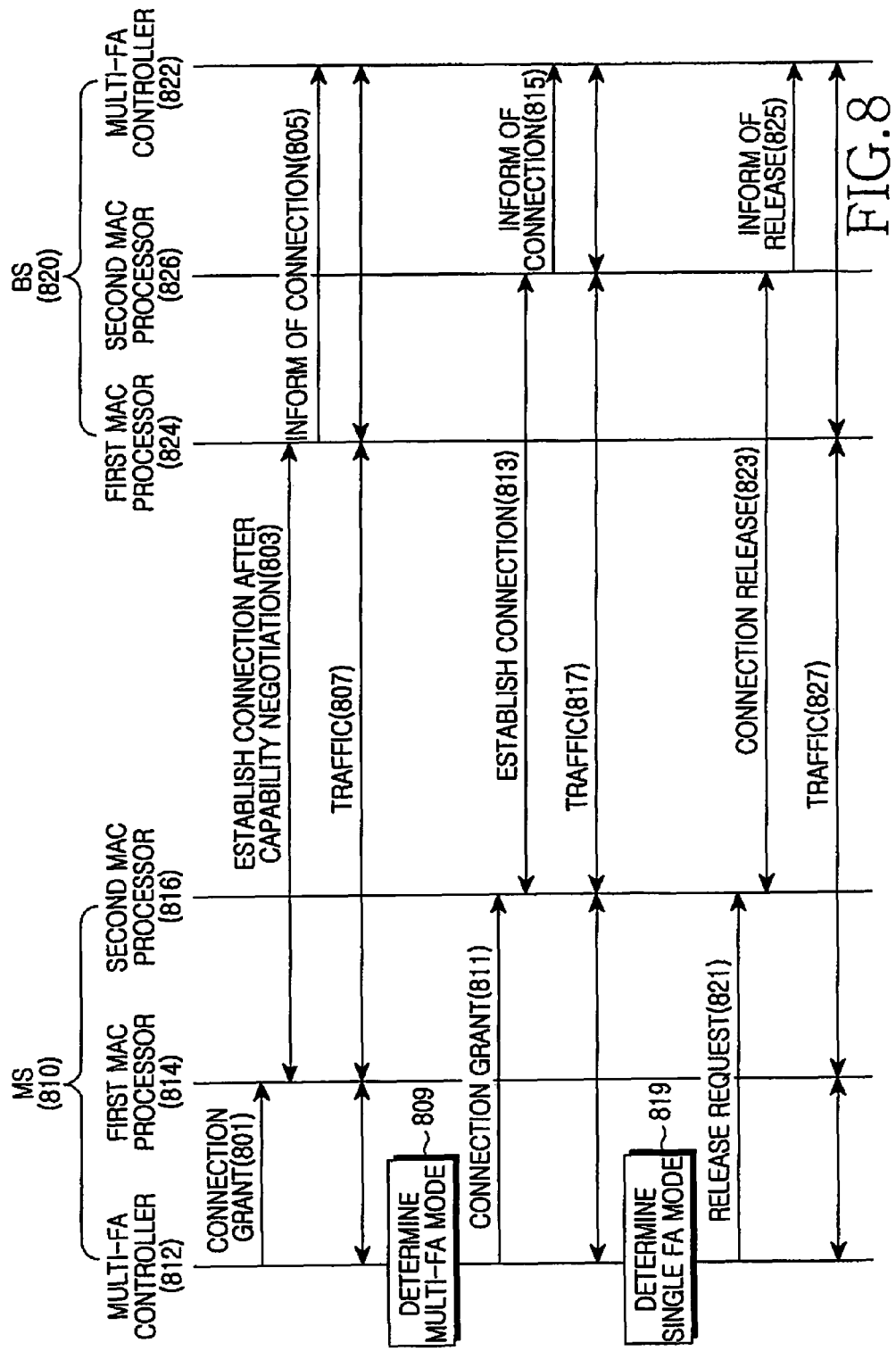
FIG. 8 illustrates signal exchanges for a mode transition in the broadband wireless communication system according to the present invention.

FIG. 8 illustrates signal exchanges for a mode transition in the broadband wireless communication system according to the present invention. In particular, FIG. 8 illustrates the signal exchange in the transition from the communications where the MS and the BS use one FA to the communications where the MS and the BS use the multiple FAs. Herein, the mode of the single FA is referred to as a single FA mode, and the mode of the multiple FAs is referred to as a multi-FA mode.

To access in the single FA mode, the multi-FA controller 812 of the MS 810 grants the connection of the first MAC processor 814 in step 801.

Upon receiving the connection grant, the first MAC processor 814 of the MS 810 performs the connection process including the capability negotiation with the first MAC processor 824 of the BS 820, and establishes the connection. In the capability negotiation, the MS 810 and the BS 820 confirm that the multi-FA connection is possible between them through the multi-FA capability negotiation in step 803.

In step 805, the first MAC processor 824 of the BS 820 informs the multi-FA controller 822 of the connection to the MS 810.

In step 807, the MS 810 and the BS 820 exchange the traffic through their respective first MAC processors 814 and 824 and communicate in the single FA mode.

Communicating in the single FA mode, the multi-FA controller 812 of the MS 810 determines whether to switch to the multi-FA mode in step 809. The multi-FA controller 822 of the BS 820 may determine whether to switch to the multi-FA mode.

In step 811, upon determining to switch to the multi-FA mode, the multi-FA controller 812 of the MS 810 grants the connection of the second MAC processor 816. In doing so, the multi-FA controller 812 directs the frequency band to be used by the second MAC processor 816. Since the frequency band can collide with the frequency band of the first MAC processor 814, the multi-FA controller 812 directs the second MAC processor 816 to use the frequency band not used by the first MAC processor 814.

Upon receiving the connection grant, the second MAC processor 816 of the MS 810 establishes the connection to the second MAC processor 826 of the BS 820 through the connection process in step 813.

In step 815, the second MAC processor 826 of the BS 820 informs the multi-FA controller 822 of the connection to the MS 810.

In step 817, the MS 810 and the BS 820 exchange the traffic through the first MAC processors 814 and 824 and the second MAC processors 816 and 826 and communicate in the multi-FA mode.

In step 819, as communicating in the multi-FA mode, the multi-FA controller 812 of the MS 810 determines whether to switch to the single FA mode. The multi-FA controller 822 of the BS 820 can determine whether to switch to the single FA mode.

Upon determining to transit to the single FA mode, the multi-FA controller 812 of the MS 810 requests the connection release to the second MAC processor 816 in step 821.

In step 823, receiving the connection release request, the second MAC processor 816 of the MS 810 releases the connection by performing the release process with the second MAC processor 826 of the BS 820.

In step 825, the second MAC processor 826 of the BS 820 informs the multi-FA controller 822 of the connection release from the MS 810.

In step 827, the MS 810 and the BS 820 exchange the traffic through their respective first MAC processors 814 and 824 and communicate in the single FA mode.

Figure 9:
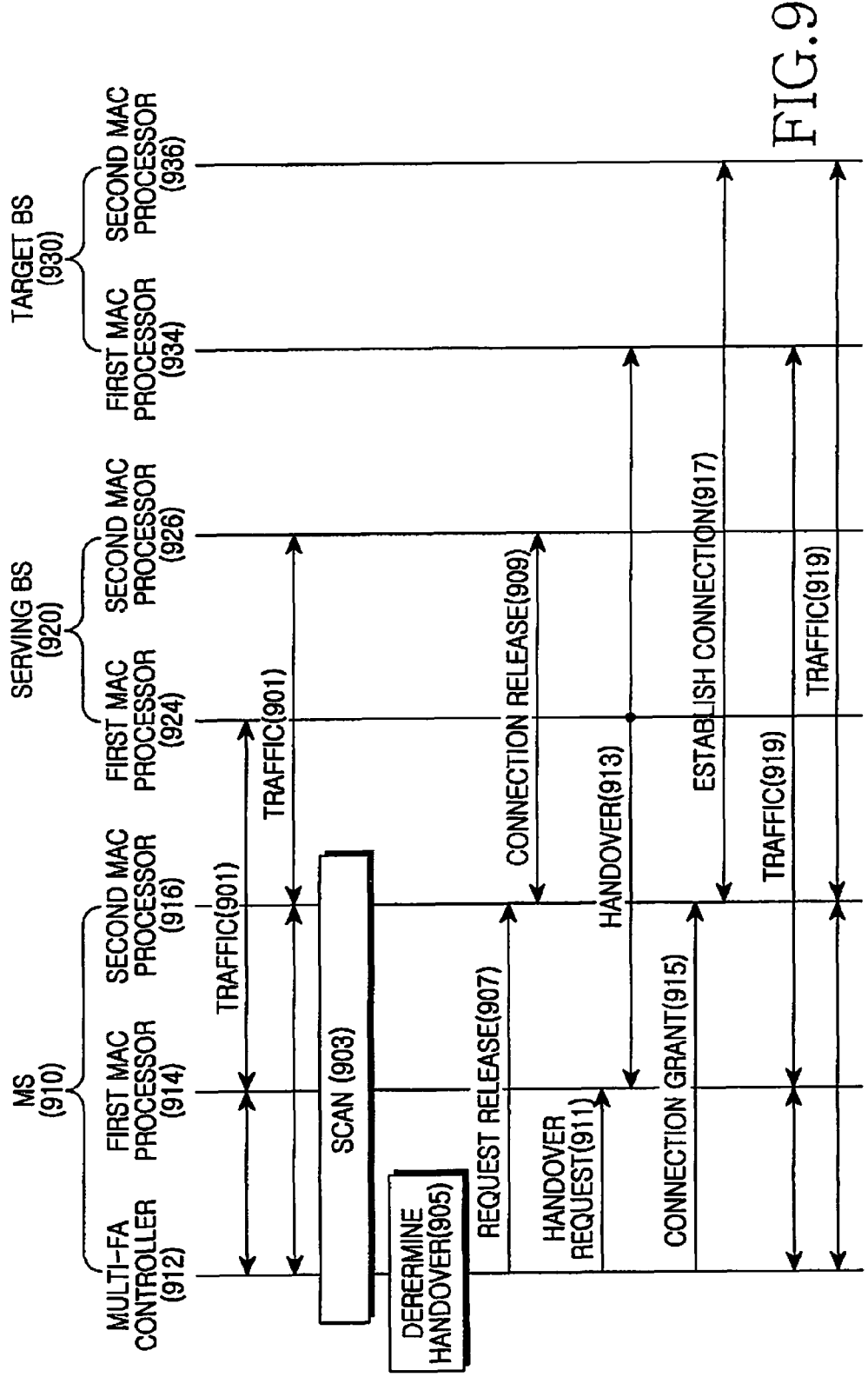
FIG. 9 illustrates signal exchanges for a handover in the broadband wireless communication system according to the present invention.

FIG. 9 illustrates signal exchanges for the handover in the broadband wireless communication system according to the present invention. In particular, FIG. 9 illustrates the signal exchanges in the handover when the MS enters the multi-FA mode.

In step 901, the MS 910 and the serving BS 920 exchange the traffic through their respective first MAC processors 914 and 924 and second MAC processors 916 and 926 and communicate with each other in the multi-FA mode.

Communicating in the multi-FA mode, the MS 910 scans for the handover. Measuring the signal strength from neighbor BSs as the signal strength from the serving BS 920 weakens in step 903.

In step 905, the multi-FA controller 912 of the MS 910 determines the handover and sets the target BS 930.

For the handover, the multi-FA controller 912 of the MS 910 requests the connection release to the second MAC processor 916 in step 907.

In step 909, the second MAC processor 916 of the MS 910, upon receiving the connection release request, releases the connection through the connection release process with the second MAC processor 926 of the serving BS 920.

In step 911, the multi-FA controller 912 of the MS 910 requests the handover to the target BS 930, to the first MAC processor 914.

In step 913, receiving the handover request, the first MAC processor 914 of the MS 910 establishes the connection by performing the handover process with the first MAC processor 934 of the target BS 930.

After the handover of the first MAC processor 914 is complete, the multi-FA controller 912 of the MS 910 grants the connection to the second MAC processor 916 in step 915. In doing so, the multi-FA controller 912 of the MS 910 directs the target BS 930 and the frequency band to use to the second MAC processor 916.

In step 917, the second MAC processor 916 of the MS 910 establishes the connection through the connection process to the second MAC processor 936 of the target BS 930.

In step 919, the MS 910 and the target BS 930 exchange the traffic through their respective first MAC processors 914 and 934 and second MAC processors 916 and 936, and communicate with each other in the multi-FA mode.

As set forth above, the broadband wireless communication system supports the terminal, which uses the wide bandwidth by means of the frequency overlay. Therefore, the compatibility for various terminals can be maintained in the process of the system bandwidth conversion.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An apparatus in a wireless communication system, the apparatus comprising:
   a controller for distributing packets, to be transmitted to a serving Base Station (BS), to a plurality of processors to transmit the packets in a multi-Frequency Allocation (FA) access mode;
   the plurality of the processors for establishing a plurality of connections for each of FAs with the serving BS, and generating Media Access Control (MAC) Protocol Data Units (PDUs) for each of the FAs, wherein the FAs include a first FA and at least one remaining FA; and
   a plurality of senders for encoding the MAC PDUs provided from the corresponding processors for each of the FAs and transmitting signals to the serving BS,
   wherein the controller determines to hand over to a target BS, switches to a single FA access mode by releasing at least one connection for each of the at least one remaining FA, hands over to the target BS from the serving BS at the first FA, and switches to the multi-FA access mode by establishing at least one connection for each of the at least one remaining FA with the target BS.

2. The apparatus of claim 1, wherein the controller controls the plurality of the processors to use different frequency band FAs.

3. The apparatus of claim 1, wherein each sender baseband-processes data output from the corresponding processor, up-converts the baseband-processed signal to a signal of a frequency band corresponding to the relevant FA, and transmits the converted signal.

4. The apparatus of claim 1, wherein the processors use different Connection IDs (CIDs).

5. The apparatus of claim 1, wherein the processors use different MAC addresses.

6. The apparatus of claim 1, wherein the controller performs a multi-FA capability negotiation in an initial access to a correspondent node.

7. The apparatus of claim 1, wherein each sender performs the physical layer encoding based on an Orthogonal Frequency Division Multiplexing (OFDM) scheme.

8. An apparatus in a wireless communication system, the apparatus comprising:
   a plurality of receivers for decoding signals concurrently received through connections for each of multiple Frequency Allocations (FAs) from a serving Base Station (BS) in multi-FA access mode, wherein the FAs include a first FA and at least one remaining FA;
   a plurality of processors for establishing the connections for each of the FAs with the serving BS and extracting Media Access Control (MAC) Service Data Units (SDUs) for each of the FAs from the decoded signals; and
   a controller for aggregating and processing the MAC SDUs,
   wherein the controller determines to hand over to a target BS, switches to a single FA access mode by releasing at least one connection for each of the at least one remaining FA, hands over to the target BS from the serving BS at the first FA, and switches to the multi-FA access mode by establishing at least one connection for each of the at least one remaining FA with the target BS.

9. The apparatus of claim 8, wherein the controller controls the processors to use different frequency band FAs.

10. The apparatus of claim 8, wherein the processors use different Connection IDs (CIDs).

11. The apparatus of claim 8, wherein the processors use different MAC addresses.

12. The apparatus of claim 8, wherein the controller performs a multi-FA capability negotiation in an initial access to a correspondent node.

13. The apparatus of claim 8, wherein each of the receivers performs the physical layer decoding based on an Orthogonal Frequency Division Multiplexing (OFDM) scheme.

14. A communication method in a wireless communication system, the method comprising:
   establishing a plurality of connections for each of Frequency Allocations (FAs) with a serving Base Station (BS), wherein the FAs include a first FA and at least one remaining FA;
   distributing packets, to be transmitted to the serving BS, on a FA basis to transmit the packets in a multi-FA access mode;
   generating Media Access Control (MAC) Protocol Data Units (PDUs) for each of the FAs;
   transmitting signals for the MAC PDUs, to the serving BS, at each of the FAs;

determining to perform a handover to a target BS;

switching to a single FA access mode by releasing at least one connection for each of the at least one remaining FA;

performing the handover to the target BS from the serving BS at the first FA; and switching to the multi-FA access mode by establishing at least one connection for each of the at least one remaining FA with the target BS.

15. The communication method of claim 14, wherein the transmitting of the generated signals comprises:

up-converting the generated signals to signals of frequency bands of the corresponding FAs respectively and transmitting the converted signals.

16. The communication method of claim 14, wherein the MAC layer processing uses different Connection IDs (CIDs) on the FA basis.

17. The communication method of claim 14, wherein the MAC layer processing uses different MAC addresses on the FA basis.

18. The communication method of claim 14, further comprising:

performing a multi-FA capability negotiation in an initial access to a correspondent node.

19. The communication method of claim 14, wherein the physical layer encoding is performed based on an Orthogonal Frequency Division Multiplexing (OFDM) scheme.

20. A communication method in a wireless communication system, the method comprising:

establishing a plurality of connections for each of Frequency Allocations (FAs) with a serving Base Station (BS), wherein the FAs include a first FA and at least one remaining FA;

decoding signals concurrently received through the connection for at each of the FAs from a serving Base Station (BS) in multi-FA access mode;

extracting Media Access Control (MAC) Service Data Units (SDUs) from the encoded signals;

aggregating and processing the MAC SDUs;

determining to perform a handover to a target BS;

switching to a single FA access mode by releasing at least one connection for each of the at least one remaining FA;

performing the handover to the target BS from the serving BS at the first FA; and switching to the multi-FA access mode by establishing at least one connection for each of the at least one remaining FA with the target BS.

21. The communication method of claim 20, wherein the MAC layer processing uses different Connection IDs (CIDs) on the FA basis.

22. The communication method of claim 20, wherein the MAC layer processing uses different MAC addresses on the FA basis.

23. The communication method of claim 20, further comprising:

performing a multi-FA capability negotiation in an initial access to a correspondent node.

24. The communication method of claim 20, wherein the physical layer encoding is performed based on an Orthogonal Frequency Division Multiplexing (OFDM) scheme.

* * * * *